United States Patent
Han

(10) Patent No.: US 8,632,913 B2
(45) Date of Patent: Jan. 21, 2014

(54) SECONDARY BATTERY

(75) Inventor: Moon-Hong Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 393 days.

(21) Appl. No.: 13/161,417

(22) Filed: Jun. 15, 2011

(65) Prior Publication Data

US 2012/0015243 A1    Jan. 19, 2012

(30) Foreign Application Priority Data

Jul. 16, 2010  (KR) ........................ 10-2010-0069104

(51) Int. Cl.
*H01M 2/02* (2006.01)
*H01M 2/04* (2006.01)
*H01M 2/08* (2006.01)

(52) U.S. Cl.
USPC ............................ 429/185; 429/175; 429/176

(58) Field of Classification Search
USPC .................. 429/185, 176, 175, 234, 96, 162; 607/36
See application file for complete search history.

(56) References Cited

U.S. PATENT DOCUMENTS

2001/0031402 A1* 10/2001 Imai et al. ...................... 429/234
2004/0127952 A1*  7/2004 O'Phelan et al. ............... 607/36
2006/0246349 A1* 11/2006 Uh ................................. 429/175
2007/0037044 A1*  2/2007 Sato et al. ........................ 429/96
2008/0274402 A1  11/2008 Uh
2009/0297940 A1* 12/2009 Nansaka et al. .............. 429/162

FOREIGN PATENT DOCUMENTS

| JP | 2008-135263 A | 6/2008 |
|---|---|---|
| KR | 10-2007-0108765 A | 11/2007 |
| KR | 10-0816218 | 3/2008 |
| KR | 10-2008-0045303 A | 5/2008 |
| KR | 10-2009-0062542 A | 6/2009 |

OTHER PUBLICATIONS

Machine Translation of: Park (KR 10-2008-0045303 A), May 23, 2008.*
Korean Office Action dated Apr. 18, 2012 issued in Korean Priority Application No. 10-2010-0069104, 1 page.

* cited by examiner

*Primary Examiner* — Basia Ridley
*Assistant Examiner* — Kenneth Douyette
(74) *Attorney, Agent, or Firm* — Christie, Parker & Hale, LLP

(57) ABSTRACT

A secondary battery includes a can having an open end and housing an electrode assembly; a cap assembly sealing the open end of the can; and an insulating case located between the electrode assembly and the cap assembly, the insulating case comprising folding protrusions protruding from a peripheral surface of the insulating case and oriented such that a first side of the folding protrusion contacts the insulating case and a second side of the folding protrusion contacts the can.

11 Claims, 4 Drawing Sheets

SECONDARY BATTERY

CROSS-REFERENCE TO RELATED APPLICATION

This application claims priority to and the benefit of Korean Patent Application No. 10-2010-0069104, filed on Jul. 16, 2010, in the Korean Intellectual Property Office, the entire content of which is incorporated herein by reference.

BACKGROUND

1. Field

Embodiments relate to a secondary battery.

2. Discussion of Related Art

Recently, as portable electronic devices have been significantly reduced in size and weight, many studies for secondary batteries used as a power supply of the devices have been conducted. Examples of secondary batteries include nickel-cadmium battery, a nickel-hydrogen batteries, a nickel-zinc batteries, and a lithium secondary batteries. Of those batteries, the lithium secondary battery can be made rechargeable, decreased in size and increase in capacity, and has high operation voltage and energy density per unit weight, such that it has been widely used for high-technology electronic devices.

A rectangular secondary battery of the lithium secondary battery is formed by locating an electrode assembly including an anode plate, a cathode plate, and a separator therebetween in a can together with an electrolyte, and then sealing the upper end of the can with a cap assembly. Further, an insulating case is inserted in the upper end of the can.

The insulating case has a hole for an anode tap and a hole for a cathode tap and is inserted to prevent a short circuit between the top of the electrode assembly received in the can and the bottom of the cap assembly. Further, the insulating case can prevent a short circuit that may be generated by contact between the cathode and anode taps and the inner wall of the can. Further, the insulating case can prevent the electrode assembly from moving within the can.

However, the insulating case can become dislodged and separated from the can when the elasticity of the electrode assembly in the can is excessive. Further, when the thickness of the electrode assembly is large, the top of the can may open causing the insulating case to loosen and separate from the can during transportation. Further, the inner side of the can may be scratched by the outer side of the insulating case and burrs are generated, such that welding between the can and the can assembly is deficient resulting in leakage of the electrolyte.

SUMMARY

An embodiment provides a secondary battery having an insulating case stably seated in the upper portion in a can and by the formation of folding protrusions on a pair of long sides of the insulating case.

According to one embodiment, a secondary battery includes a can having an open end and housing an electrode assembly; a cap assembly sealing the open end of the can; and an insulating case located between the electrode assembly and the cap assembly, the insulating case including folding protrusions protruding from the insulating case and oriented such that a first side of the folding protrusion contacts the insulating case and a second side of the folding protrusion contacts the can.

In one embodiment, the folding protrusions are spaced from a bottom of the insulating case, for example, by between about 1/6 to about 5/6 of the height of the insulating case. Additionally, the folding protrusions may be on opposing long sides of the pair of long sides and may be substantially symmetrical to each other.

Further, in one embodiment, the folding protrusions each have a groove substantially adjacent to a hinge at which the folding protrusion is folded. Additionally, the secondary battery as claimed in claim 1, wherein a plurality of notches are on the insulating case and wherein each of the folding protrusions protrude from one of the notches. In one embodiment, a depth of the notch is substantially equal to a thickness of the folding protrusions.

As described above, according to the present invention, it is possible to prevent an insulating case inserted and fixed at the upper portion in a can from being scratched by the inner side of the can and the insulating case from separating outside from the can by forming folding protrusions on a pair of long sides of the insulating case to more stably seat the insulating case at the upper portion in the can.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
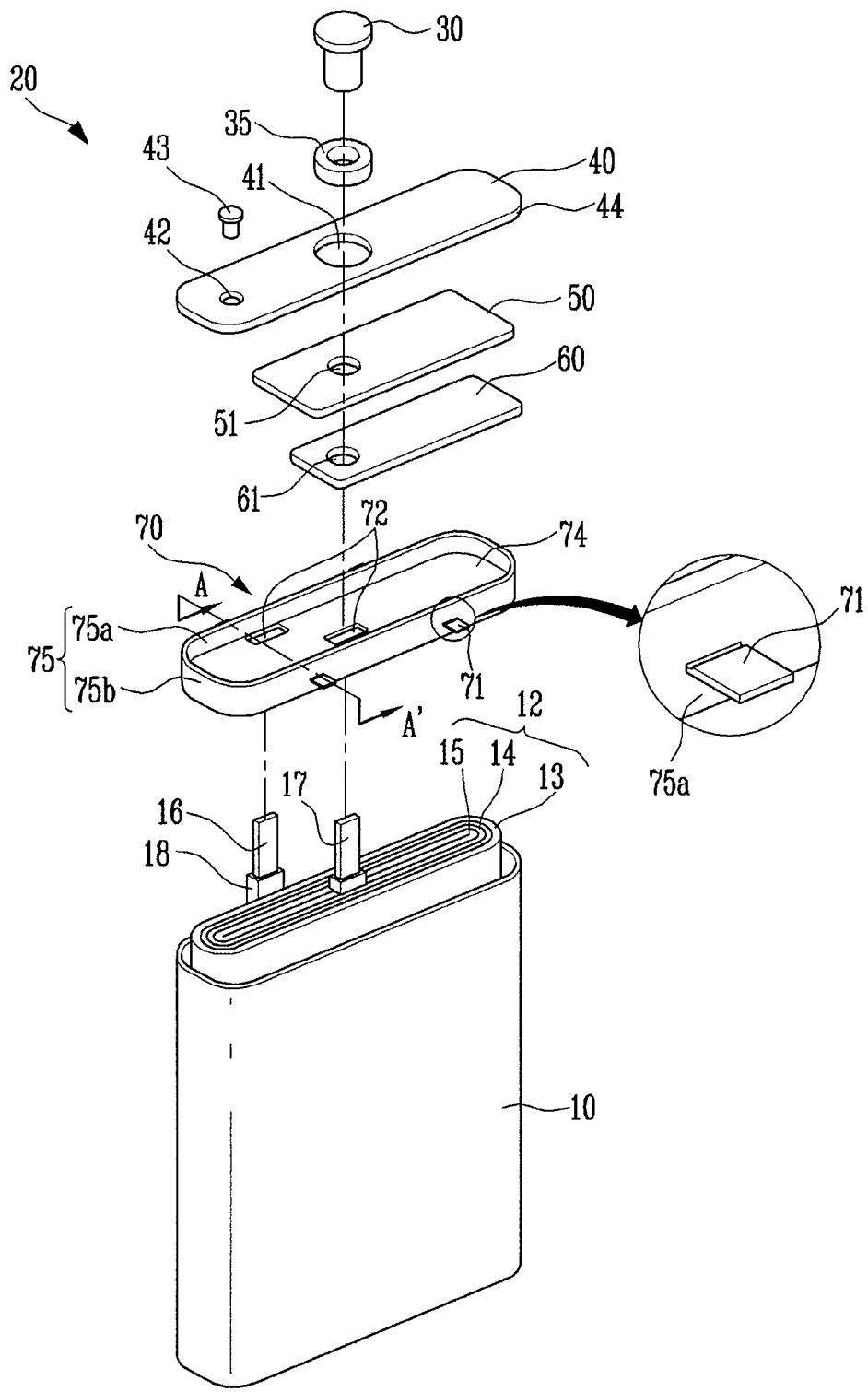
FIG. 1 is an exploded perspective view showing a secondary battery according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

A secondary battery according to the present invention is described hereafter in detail with reference to the accompanying drawings showing embodiments of the present invention.

FIG. 1 is an exploded perspective view showing a secondary battery according to an embodiment of the present invention.

Referring to FIG. 1, a secondary battery according to an embodiment of the present invention includes a can 10 having a open end and accommodating an electrode assembly 12, a cap assembly 20 sealing the opening of the can 10, and an insulating case 70 positioned between the electrode assembly 12 and the cap assembly 20 and inserted at the upper portion in the can 10. Further, folding protrusions 71 are formed at positions on the outer side of the insulating case 70 which is in contact with the can 10.

The folding protrusions 71 are folded upward (i.e., towards the cap assembly) from the insulating case 70 when being inserted in the can 10 such that one side is in contact with the outer side of the insulating case 70 and the other side is in contact with the inner side of the can 10. Therefore, the insulating case 70 is stably seated at the upper portion in the can 10, such that it is possible to prevent the outer side of the insulating case 70 from being scratched by the inner side of the can 10 and to reduce the likelihood of the insulating case 70 from separating from the can 10. In other words, the folding protrusions 71 folded upward from the insulating case 70 prevent the insulation case from dislodging from the can 10 by compression generated therefrom.

The horizontal (i.e., lateral) cross section of the insulating case 70 is substantially rectangular with a pair of long sides 75a and a pair of short sides 75b forming the outer periphery 75 of the insulating case 70. In embodiments, the folding protrusions 71 may be formed on either the pair of short sides 75b or on the pair of long sides 75a, or on both the short sides and the long sides. In this configuration, the horizontal cross section of the insulating case may be a rectangle with the corners rounded, but the shape is not limited thereto.

In one embodiment, the folding protrusions 71 are symmetrically formed at the same positions on the long sides 75a opposite to each other, such that it is possible to prevent an imbalanced insertion in which the insulating case 70 inclines to one of the long sides 75a when being inserted in the can 10. Only one pair of folding protrusions 71 may be formed, but two pairs may be formed, as shown in the figures, to more stably seat the insulating case 70 and in other embodiments additional numbers of folding protrusions may be formed.

Further, the folding protrusions 71 are spaced from the bottom 74 of the insulating case 70, which is described below with reference to FIG. 3.

The insulating case 70 is positioned between the electrode assembly 12 and the cap assembly 20 for electric insulation, and in detail, it is kept inserted at the upper portion in the can 10. The insulating case 70 is generally made of hard plastic resin having excellent electric insulation. Therefore, when the insulating case 70 is inserted in the can 10, it is not substantially deformed by the electrolyte and it is easy to ensure insulation between the electrode assembly 12 and the cap assembly 20. However, when the insulating case 70 is made of hard plastic resin, the elasticity is small and it may be difficult to insert the insulating can 10. As such, the insulating case 70 includes a base 74 and a support 75 to be stably inserted in the can 10. In this configuration, the base 74 is the bottom of the insulating case 70 which was described above and the support 75 is the outer side of the insulating case 70; therefore, the base 74 and the support 75 are hereafter referred to the bottom and the outer side of the insulating case 70, respectively, for the convenience of the description.

In more detail, the bottom 74 of the insulating case 70 is formed of a plate having a substantially uniform thickness and has a shape similar to the horizontal cross-sectional shape of the can 10. Further, in one embodiment the bottom 74 of the insulating case 70 is slightly larger than the cross section of the can for press-fitting in the can 10. An electrolyte inlet and lead-through holes 72 are formed through the bottom 74 of the insulating case 70.

Further, the outer side 75 of the insulating case 70 is integrally formed with the bottom 74 along the edge of the bottom 74. The outer side 75 of the insulating case 70 makes it possible to ensure a gap between the cap assembly 20 and the bottom 74 of the insulating case 70 when the cap assembly 20 and the insulating case 70 are accommodated in the can 10.

Since the folding protrusions 71 are formed on the pair of long sides 75a of the outer side 75 of the insulating case 70, the insulating case 70 can be more easily seated when the insulating case 70 is press-fitted in the can 10, such that the insulating case 70 can be prevented from separating from the can 10.

The electrode assembly 12 is formed by locating a separator 14 between an anode plate 15 and a cathode plate 13. An anode tap 16 is connected to the anode plate 15, protruding upward from the electrode assembly 12, and a cathode tap 17 is connected to the cathode plate 13, protruding upward from the electrode assembly 12. The anode tap 16 and the cathode tap 17 are spaced from each and are electrically connected in the electrode assembly 12. Further, a lamination tape 18 is wound at the portion where the anode tap 16 and the cathode tap 17 are drawn from the electrode assembly 12. Further, the lamination plate 18 blocks heat generated from the anode tap 16 or the cathode tap 17 and prevents the electrode plate 12 from being pressed by the edges of the anode tap 16 and the cathode tap 17.

In this configuration, the anode tap 16 and the cathode tap 17 are electrically connected with the anode plate 15 and the cathode plate 13 of the electrode assembly, respectively, and are drawn out to the opening of the can 10. In this configuration, the anode tap 16 and the cathode tap 17 are electrically connected with the can 10 or the terminal plate 60 through the lead-through holes 72 of an insulating case 70 fixed to the upper portion of the electrode assembly 12 in the can 10.

The anode plate 15 and the cathode plate 13 are formed by dry coating a slurry on a thin aluminum layer and a thin copper layer, respectively. The slurry contains the active substances of the anode plate 15 and the cathode plate 13 and a fixing agent bonding the active substances to the thin metal layer. Further, for lithium secondary batteries, although the anode active substance is usually a lithium containing oxide and the cathode active substance may be any one of hard carbon, soft carbon, graphite, and carbon substances, the present invention is not limited to those lithium secondary batteries.

The can 10 accommodates the electrode assembly through the opening and the horizontal cross section of the can 10 is formed in a rectangle with the corners rounded, including a pair of short sides 10a and a pair of long sides 10b. The horizontal cross-sectional shape of the can 10 is not limited to the above, and the horizontal cross-sectional shape of the can 10 may be a rectangle or an ellipse. In one embodiment, the can 10 is made of aluminum or an aluminum alloy that is light and has flexibility. Further, the can 10 may be manufactured by a deep drawing method.

The cap assembly 20 includes a cap plate 40, an electrode terminal 30, an insulating plate 50, a terminal plate 60, and a gasket 35. The cap plate 40 can define one side of the can 10 by sealing the opening of the can 10 when the cap assembly 20 and the can 10 are combined. For this configuration, the cap plate 40 may be attached to the opening of the can 10 by, for example, welding, etc. Further, the cap plate 40 is electrically connected with any one of the anode tap 16 and the cathode tap 17 drawn out through the lead-through holes 72 of the insulating case 70. Further, the cap plate 40 has a first terminal hole 41 for combination with a gasket 35 and an electrolyte inlet 42 for injecting an electrolyte. The electrolyte inlet 42 formed in the cap plate 40 is used as a channel for injecting an electrolyte into the can 10. Further, the electrolyte inlet 42 is sealed with a cap 43 after the electrolyte is injected.

The gasket 35 is provided for insulation between the electrode terminal 30 and the cap plate 40 and has a first terminal hole 41 for combination with the electrode terminal 30, and the electrode terminal 30 is combined with the gasket 35 through the first terminal hole 41.

Further, the insulating plate 50 is located between the cap plate 40 and the terminal plate 60 for insulation and a second terminal hole 51 through which the electrode terminal 30 passes is formed in the insulating plate 50.

Additionally, the terminal plate 60 is electrically connected with the electrode terminal 30 by the third terminal hole 61 and the terminal plate 61 is electrically connected with the other one of the anode tap 16 and the cathode tap 17 which is not connected with the cap plate 40. In other words, when the cap plate 40 is electrically connected with the anode tap 16, the terminal plate 60 is connected with the cathode tap 17 and accordingly, electric connection between the electrode terminal 30 and the cathode tap 17 can be achieved.

Figure 2:
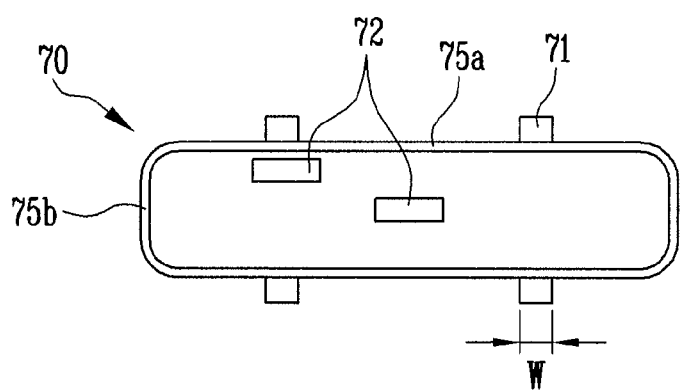
FIG. 2 is a plan view showing in detail the insulating case shown in FIG. 1.

FIG. 2 is a plan view showing in detail the insulating case shown in FIG. 1.

Referring to FIG. 2, two folding protrusions 71 are formed on the pair of long sides 75a of the insulating case 70, with the folding protrusions on opposing sides generally corresponding to each other. In this configuration, the width W of the folding protrusion 71 may be within the range of about 0.5 mm to about 2.0 mm. When the width W of the folding protrusion 71 is less than about 0.5 mm, it is difficult to not only form the folding protrusion 71, but also to sufficiently prevent the insulating case 70 from protruding from the can 10. Further, when the width W of the folding protrusion 71 is more than about 2.0 mm, the folding protrusion 71 is not easily folded upward when being inserted into the can 10, such that it is difficult to insert the insulating case 70 in the can 10. Accordingly, in one embodiment, the width W of the folding protrusion 71 is in the range of about 0.5 mm to about 2.0 mm.

Figure 3:
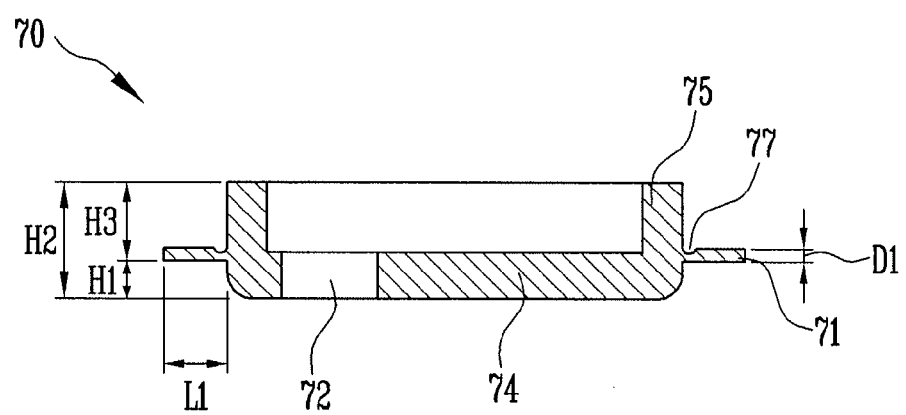
FIG. 3 is a cross-sectional view taken along the line A-A' of FIG. 1.

FIG. 3 is a cross-sectional view taken along the line A-A' of FIG. 1.

FIG. 3 shows the insulating case 70 with the folding protrusions 71, when seen in a cross section horizontally with the cross-sectional side of the insulating case 70. The folding protrusions 71 formed on the pair of long sides 75a (see FIG. 1) of the insulating case 70 are spaced at a distance from the bottom 74 (see FIG. 1) of the insulating case 70.

In this configuration, the distance H1 between the folding protrusions 71 and the bottom 74 of the insulating case 70 may be about ⅙ to about ⅚ of the height H2 of the insulating case 70. When the distance is less than about ⅙ of the height H2 of the insulating case 70, it may not be possible to easily insert the insulating case 70 into the can 10, and when it is more than about ⅚, folding the folding protrusions 71 has little effect.

Further, in one embodiment, the length L1 of the folding protrusions 71 is smaller than the distance H3 obtained by subtracting the distance H1 from the bottom 74 from the height H2 of the insulating case 70. That is, the length L1 should be determined such that the folding protrusions 71 do not protrude from the insulating case 70 after being inserted and folded in the can 10.

Further, the thickness D1 of the folding protrusions 71 is in the range of about 0.1 mm to about 0.5 mm. It is difficult to form the folding protrusions 71 when the thickness D1 of the folding protrusions 71 is less than 0.1 mm. Further, when the thickness D1 of the folding protrusion 71 is more than 0.5 mm, similar to when the width W (see FIG. 2) of the folding protrusions 71 is large, the folding protrusion 71 is not easily folded upward when being inserted into the can 10, such that it is difficult to insert the insulating case 70 in the can 10.

As described above, the folding protrusions 71 are easily folded when the insulating case 70 is inserted into the can 10, and the width W, the thickness D1, and the distance H1 from the bottom 74 of the insulating case 70 should be appropriately determined for easy insertion.

Further, the folding protrusions 71 may have a groove 77 at the folded portion on one side (i.e., adjacent to a hinge at which the folding protrusion is folded). The grooves 77 allow the folding protrusions 71 to be easily folded when they are inserted into the case.

Figure 4A:
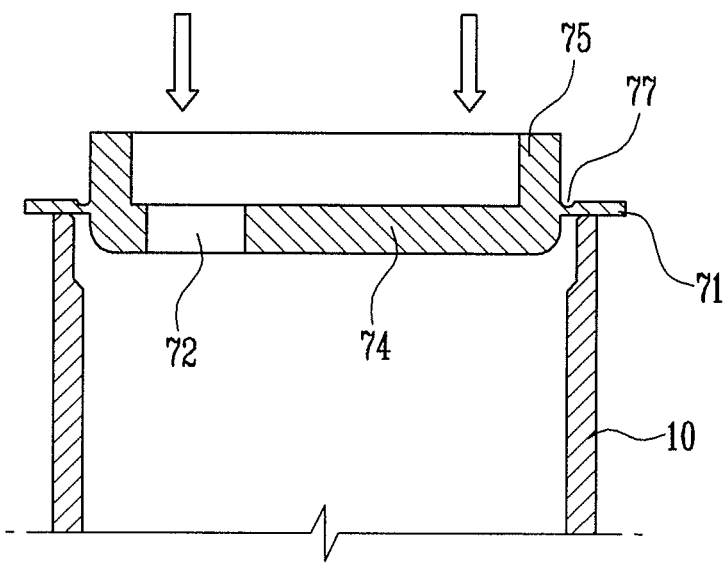
FIG. 4A is a cross-sectional view of the insulating case of FIG. 1 resting on the can.
Figure 4B:
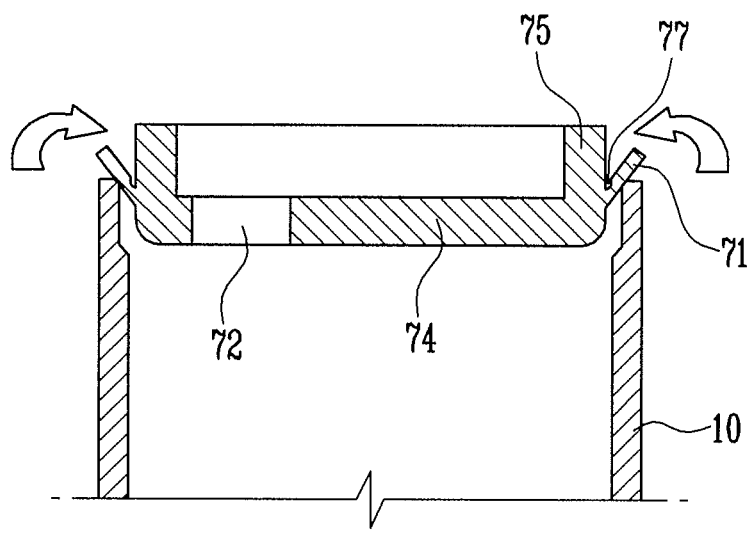
FIG. 4B is a cross-sectional view when the insulating case of FIG. 1 is being inserted in the can.

FIG. 4A is a cross-sectional view of the insulating case 75 according to an embodiment of the present invention resting on the can before the insulating case is inserted in the can, FIG. 4B is a cross-sectional view of the insulating case being inserted in the can, and FIG. 4B is a cross-sectional view of when the insulating case has been inserted and seated in the can.

Figure 4C:
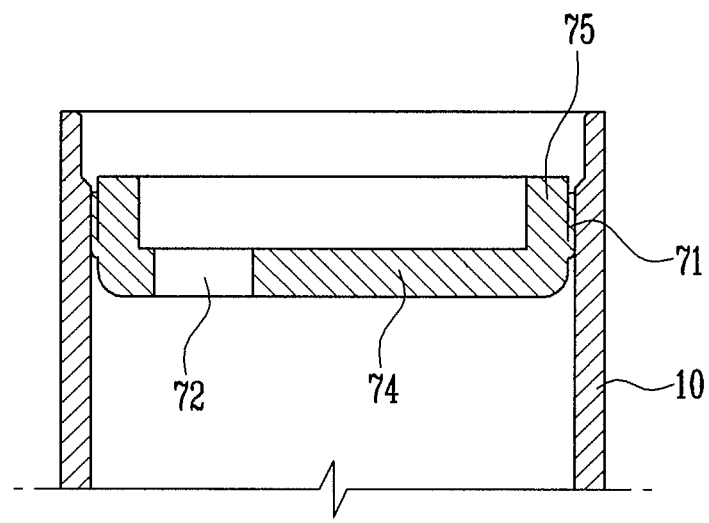
FIG. 4C is a cross-sectional view when the insulating case of FIG. 1 has been inserted and seated in the can.

Referring to FIGS. 4A to 4C, the distance between the inner sides of the can 10 which are in contact with the folding protrusions 71 is larger than the width of the short side 75b (see FIG. 1) of the insulating case 70, and smaller than the width of the short side 75b of the insulating case 70 including the folding protrusions 71. Accordingly, the folding protrusions 71 are stopped by the uppermost end of the can 10 when the insulating case 70 is inserted into the can 10.

Since the insulating case 70 is press-fitted in the can 10, the folding protrusions 71 made of a material having strength less than the can are folded upward from the insulating case 70 by forcibly inserting the insulating case 70 into the can 10 from above.

Thereafter, the insulating case 70 is seated at the upper portion in the can 10, in which the folded portions of the folding protrusions 71 are in contact with the long sides 75a of the insulating case 70 (FIG. 4C). As described above, it is possible to more stably seat the insulating case 70 at the upper portion in the can 10 by using the folding protrusions 71, and it is also possible to prevent the outer side 75 of the insulating case 70 inserted and fixed at the upper portion in the case from being scratched by the inner side of the can 10. Further, it is possible to prevent or reduce the likelihood of the insulating case 70 being separated from the can 10.

Figure 5:
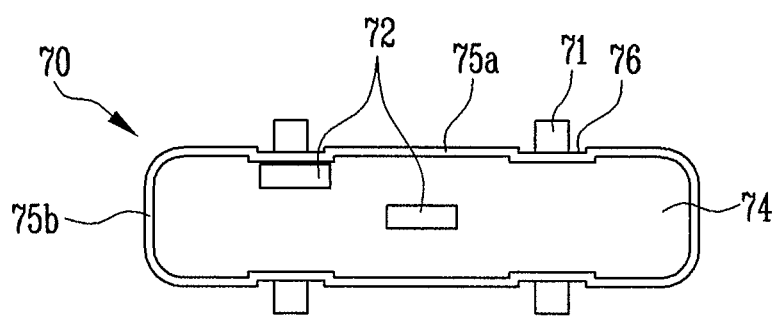
FIG. 5 is a plan view showing an insulating case according to another embodiment of the present invention.

FIG. 5 is a plan view showing an insulating case according to another embodiment of the present invention.

Referring to FIG. 5, notches 76 recessed inward toward a center of the insulation case are formed on the long sides 75a of the outer side of an insulating case and folding protrusions 71 may be formed at the notches 76. In one embodiment, the notches 76 are recessed inward about as much as the thickness of the folding protrusions 71. Since the folding protrusions 71 are folded upward from the insulating case 70 and pressed inside the can, the insulating case can be tightly inserted, even if the folding protrusions 71 are formed in the notches 76. Further, it is possible to prevent the insulating case 70 from protruding from the can.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
    a can having an open end and housing an electrode assembly;
    a cap assembly sealing the open end of the can; and
    an insulating case located between the electrode assembly and the cap assembly, the insulating case comprising folding protrusions protruding from the insulating case and oriented such that a first side of the folding protrusion contacts the insulating case and a second side of the folding protrusion contacts the can.

2. The secondary battery as claimed in claim 1, wherein the folding protrusions are spaced from a bottom of the insulating case.

3. The secondary battery as claimed in claim 2, wherein the folding protrusions are spaced from the bottom by between about 1/6 to about 5/6 of the height of the insulating case.

4. The secondary battery as claimed in claim 1, wherein a lateral cross section of the insulating case is a rectangle with a pair of long sides and a pair of short sides, and wherein the folding protrusions are located on the pair of long sides.

5. The secondary battery as claimed in claim 4, wherein the folding protrusions on opposing long sides of the pair of long sides are substantially symmetrical to each other.

6. The secondary battery as claimed in claim 4, wherein a first plurality of the folding protrusions are formed on a first long side of the pair of long sides and wherein a second plurality of the folding protrusions are symmetrically formed on a second long side of the pair of long sides.

7. The secondary battery as claimed in claim 1, wherein the folding protrusions each have a groove substantially adjacent to a hinge at which the folding protrusion is folded.

8. The secondary battery as claimed in claim 1, wherein a plurality of notches are on the insulating case and wherein each of the folding protrusions protrude from one of the notches.

9. The secondary battery as claimed in claim 8, wherein a depth of the notch is substantially equal to a thickness of the folding protrusions.

10. The secondary battery as claimed in claim 1, the thickness of the folding protrusions is in the range of 0.1 mm to 0.5 mm.

11. The secondary battery as claimed in claim 1, the width of the folding protrusions is in the range of 0.5 mm to 2.0 mm.

* * * * *